United States Patent
Otsuka

(10) Patent No.: US 7,471,958 B2
(45) Date of Patent: Dec. 30, 2008

(54) CORDLESS TELEPHONE SYSTEM, TELEPHONE EQUIPMENT AND TERMINAL DEVICE USED IN CORDLESS TELEPHONE SYSTEM

(75) Inventor: Naoki Otsuka, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 380 days.

(21) Appl. No.: 10/437,178

(22) Filed: May 14, 2003

(65) Prior Publication Data
US 2003/0216146 A1 Nov. 20, 2003

(30) Foreign Application Priority Data
May 15, 2002 (JP) ............... 2002-140510

(51) Int. Cl.
*H04Q 7/20* (2006.01)
(52) U.S. Cl. ............. 455/462; 455/550.1; 455/556.1; 455/463; 455/90.2
(58) Field of Classification Search ............. 455/550.1, 455/556.1, 90.2, 100.1, 463, 462; 379/100.01
See application file for complete search history.

(56) References Cited

U.S. PATENT DOCUMENTS

| | | | | |
|---|---|---|---|---|
| 5,752,195 A | * | 5/1998 | Tsuji et al. ............ | 455/462 |
| 6,119,000 A | * | 9/2000 | Stephenson et al. ..... | 455/432.1 |
| 6,711,419 B1 | * | 3/2004 | Mori .................. | 455/556.1 |
| 7,257,107 B2 | * | 8/2007 | Swier et al. ........... | 370/338 |
| 2002/0031206 A1 | * | 3/2002 | Matsunsami ............ | 379/67.1 |
| 2003/0083095 A1 | * | 5/2003 | Liang ................. | 455/552 |
| 2003/0157929 A1 | * | 8/2003 | Janssen et al. ......... | 455/416 |
| 2004/0132485 A1 | * | 7/2004 | Charney et al. ........ | 455/552.1 |

FOREIGN PATENT DOCUMENTS

| JP | A 2001-7921 | 1/2001 |
|---|---|---|
| JP | A-2001-145163 | 5/2001 |
| JP | A-2001-352377 | 12/2001 |

OTHER PUBLICATIONS

"Specification of the Bluetooth System Core," Bluetooth SIG, Feb. 22, 2001, Version 1.1, p. 48.

* cited by examiner

*Primary Examiner*—Charles N Appiah
*Assistant Examiner*—Fred A Casca
(74) *Attorney, Agent, or Firm*—Oliff & Berridge, PLC

(57) ABSTRACT

A cordless telephone system including a telephone equipment, and a terminal device capable of wireless communication with the telephone equipment. Each of the terminal devices includes an identification-information memory unit for storing terminal-device identification information. The telephone equipment includes an output unit for outputting, explicitly to a user, at least one of the identification information and information associated with the identification information about a plurality of terminal devices that transmit the identification information, a user-operated unit operated by the user, and a register unit for storing the identification information about the terminal device so that the terminal device acts as a child device.

13 Claims, 9 Drawing Sheets

FIG. 4 A
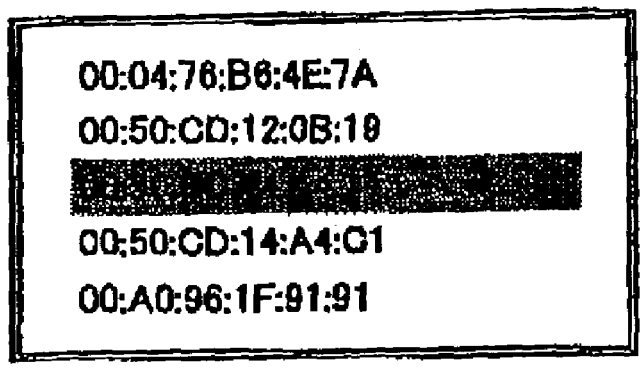
FIG. 4 B
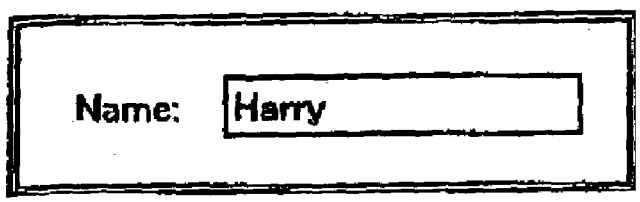
FIG. 4 C
| No. | Name | BD_ADDR |
|---|---|---|
| 1 | Harry | 00:50:CD:14:A4:14 |
| 2 | Helen | 00:04:76:B6:4E:7A |
| 3 | Ron | 00:A0:96:1F:91:91 |
| 4 | Mike | 00:50:CD:14:A4:C1 |
| 5 | Allen | 00:50:CD:12:0B:19 |

Allen

Helen
Mike
Ron

CORDLESS TELEPHONE SYSTEM, TELEPHONE EQUIPMENT AND TERMINAL DEVICE USED IN CORDLESS TELEPHONE SYSTEM

BACKGROUND OF THE INVENTION

1. Field of the Invention

The present invention relates to a cordless telephone system capable of registering a terminal device capable of wireless communication with a telephone equipment as a child device, and relates to a telephone equipment and a terminal device included in the system.

2. Description of the Related Art

Known cordless telephone systems typically include a telephone equipment acting as a parent device and a cordless handset acting as a child device. In the cordless telephone system, when the child device is registered to the parent device for extension, the following operations are generally performed. First, a key operation that triggers child-device registration (e.g., simultaneous pushdown of a power key and a hold key) is performed for the parent device. Next, after an extension number to be allocated to a child device being registered has been inputted to the parent device, a password is inputted to the parent device. Then, a key operation that triggers child-device registration is performed for the child device. After the same extension number as that inputted to the parent device has been inputted to the child device, the same password as that inputted to the parent device is inputted to the child device. With such operations, data is transmitted and received by radio between the parent device and the child device, so that data that is required for child-device registration is exchanged. In this way, the child-device registration to the parent device is completed. Such complicated child-device registration, however, imposes a heavy load on the user. The load on the user is increased as the number of the child devices to be registered increases.

Cellular phones equipped with a wireless communication interface based on the Bluetooth specification which is one of the short-range wireless communications standards are recently in practical use. If a Bluetooth communication network (namely, piconet) is configured between a cellular phone equipped with such a Bluetooth communication interface and another telephone equipment equipped with the Bluetooth communication interface, the cellular phone can be used as a child device of the telephone equipment utilizing cordless Telephony Profile, i.e., Bluetooth profile prepared for cordless telephones. Here, a profile means a group of communication protocol for a group of products. Cellular phones, however, are rarely shared by a plurality of users as different from child devices in the conventional cordless telephone system, but are often used for private use. Accordingly, if cellular phones are intended to be used as the child devices of a telephone equipment, the number of cellular phones to be registered to one parent device must be large. Therefore, the child-device registration procedure for the cellular phone to the parent device in the same way as in the conventional cordless telephone system will impose an excess operating load on the user.

SUMMARY OF THE INVENTION

Accordingly, it is an object of the present invention to provide a cordless telephone system capable of selectively and easily registering a terminal device from a plurality of terminal devices to be used as a child device.

It is another object of the invention to provide a telephone equipment used in the cordless telephone system capable of selectively and easily registering a terminal device from a plurality of terminal devices to be used as a child device.

It is still another object of the invention to provide a terminal device used in the cordless telephone system capable of selectively and easily registering a terminal device from a plurality of terminal devices to be used as a child device.

A cordless telephone system according to the invention includes a telephone equipment connectable to a phone line, and a terminal device capable of wireless communication with the telephone equipment. The system allows the terminal device to communicate with an external communication device connected to the phone line as a child device of the telephone equipment. Each of the terminal devices comprises an identification-information memory unit for storing terminal-device identification information, and a wireless communication unit, which transmits the identification information stored in the identification-information memory unit to the telephone equipment. The telephone equipment comprises a wireless communication unit capable of wireless communication with the wireless communication unit of the terminal device, an output unit for outputting, explicitly to a user, at least one of the identification information and information associated with the identification information about a plurality of terminal devices that transmit the identification information, a user-operated unit operated by the user for selectively inputting at least one of the identification information and the associated information about a terminal device selected from the plurality of terminal devices relating to the information outputted by the output unit, and a register unit for storing the identification information about the terminal device so that the terminal device acts as a child device, at least one of the identification information and the associated information about the terminal device being inputted through the user-operated unit.

A telephone according to the invention is used in the cordless telephone system described above, comprising: a wireless communication unit; an output unit for outputting, explicitly to a user, at least one of the identification information and information associated with the identification information about a plurality of terminal devices that transmit the identification information; a user-operated unit operated by the user for selectively inputting at least one of the identification information and the associated information about a terminal device selected from the plurality of terminal devices relating to the information outputted by the output unit; and a register unit for storing the identification information about the terminal device so that the terminal device acts as a child device, at least one of the identification information and the associated information about the terminal device being inputted through the user-operated unit.

With such an arrangement, the user can easily register a terminal device to be used as a child device by inputting, with the user-operated unit, at least one of the terminal-device identification information and the associated information of a desired terminal device, which is selected from a plurality of terminal devices whose information is explicitly outputted to a user by the output unit. The output unit may include a display for displaying information in the form of text or image. Alternatively, the output unit may include a handset or a speaker which outputs information in the form of sound.

In another aspect, a terminal device according to the invention is used in the cordless telephone system described above, comprising: a communication-information memory unit for storing communication information concerning the communication with the telephone equipment; and a wireless communication unit, which transmits the communication information stored in the communication-information memory unit to the telephone equipment. Upon reception of a command from the telephone equipment, the wireless communication unit returns the communication information stored in the communication-information memory unit to the telephone equipment only when the terminal device satisfies a predetermined condition specified by the command.

With such an arrangement, a terminal device that does not satisfy the predetermined condition sends no communication information even if it receives the command from the telephone equipment. Accordingly, a terminal device that sends no information is not allowed to be registered as a child device. Thus, erroneous registration of a terminal device that does not satisfy the predetermined condition can be prevented. For example, when the predetermined condition include a cordless telephone function, no identification information is sent from a terminal device, such as a printer without the cordless telephone function, to the telephone equipment.

BRIEF DESCRIPTION OF THE DRAWINGS

Other and further objects, features and advantages of the invention will appear more fully from the following description taken in connection with the accompanying drawings in which:

FIG. 4A is an example of a search-result display screen in the cordless telephone system of FIG. 1.

FIG. 4B is an example of a child-device-name input screen in the cordless telephone system of FIG. 1.

FIG. 4C is an example of a storage table for the BD address and the name of the child device in the cordless telephone system of FIG. 1.

DESCRIPTION OF THE PREFERRED EMBODIMENT

Figure 1:
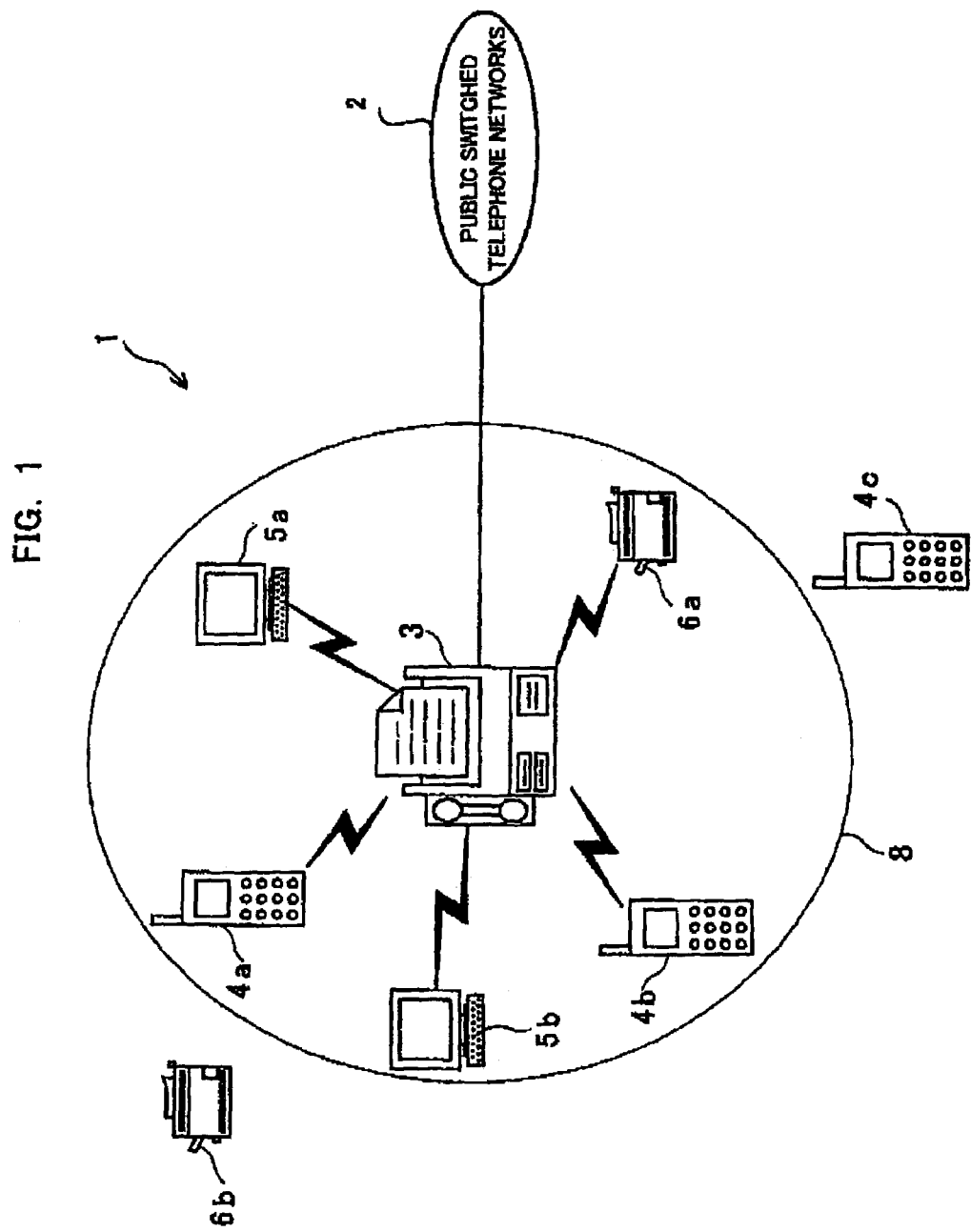
FIG. 1 is a schematic diagram of a cordless telephone system according to a first embodiment of the present invention.

The rough arrangement of a cordless telephone system according to a first embodiment of the present invention will first be described. A cordless telephone system 1 shown in FIG. 1 includes a multifunction peripheral (MFP) 3 having a telephone function as a telephone equipment acting as a parent device. The MFP 3 is connected with public switched telephone networks 2. In FIG. 1, the MFP 3 has three cellular phones 4a, 4b, and 4c, two personal computers (hereinafter, abbreviated as PCs) 5a and 5b, and two printers 6a and 6b in the periphery thereof.

Figure 2:
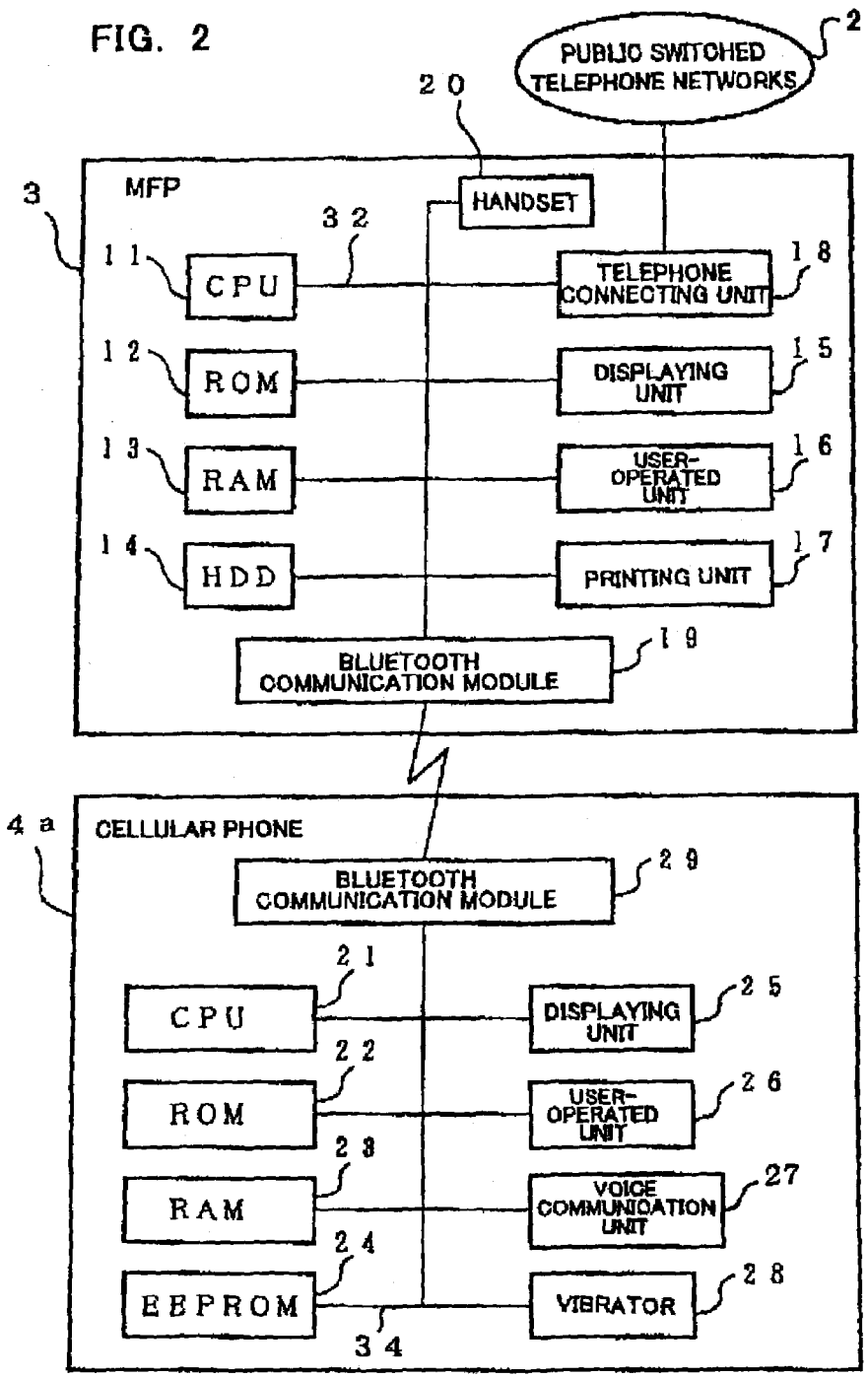
FIG. 2 is a block diagram of the cordless telephone system shown in FIG. 1.

The MFP 3 includes a Bluetooth communication module 19 (see FIG. 2). The cellular phones 4a, 4b and 4c, the Pcs 5a and 5b, and the printers 6a and 6b also include a Bluetooth communication module. In the present embodiment, only the MFP 3 and the cellular phones 4a, 4b, 4c have Cordless Telephony Profile. The MFP 3 serves as a master to perform Bluetooth wireless communication with other peripheral terminal devices serving as slaves. The Bluetooth wireless communication uses the bandwidth of 2.4 GHz. The wireless communication area (piconet area) in the Bluetooth system is within about 10 to 100 meters radius from the master, the size of the communication area depending on the class of the transmission output. The Bluetooth wireless communication is characterized in that all the devices can be connected with each other by wireless.

More specifically, the MFP 3 can be communicated with the terminal devices within a communication area 8 which is a circle having a given radius around it. Accordingly, in the example of FIG. 1, the two cellular phones 4a and 4b, the two PCs 5a and 5b, and the one printer 6a in the communication area 8 can communicate with the MFP 3. On the other hand, the cellular phone 4c and the printer 6b outside the communication area 8 cannot communicate with the MFP 3.

In the present embodiment, among the five terminal devices 4a, 4b, 5a, 5b, and 6a in the communication area 8, only the two cellular phones 4a and 4b having the Cordless Telephony Profile are allowed to perform voice communication. Accordingly, in the cordless telephone system 1 of FIG. 1, only the two cellular phones 4a and 4b can communicate with the MFP 3 as child devices by performing a child-device registration for the MFP 3 as described later. The cellular phone 4c outside the communication area 8 may also be registered with the MFP 3 as a child device. In this case, moving the cellular phone 4c into the communication area 8 allows the cellular phone 4c to act as a child device.

In the cordless telephone system 1 with the cellular phones 4a and 4b being registered as child devices, voice communication is allowed between the cellular phones 4a and 4b and an external communication device over the MFP 3 and the public switched telephone networks 2. Specifically, when the MFP 3 receives an incoming call from an external communication device over the public switched telephone networks 2, the MFP 3 sends an incoming-call notification to a cellular phone selected by a user from the two cellular phones 4a and 4b registered as child devices. The cellular phone 4a, 4b that has received the incoming-call notification make ringing sounds as in a conventional incoming call through a cell phone carrier. When the user receives the Shone call with either one of the two cellular phones 4a and 4b, a communication is established between the cellular phone and the external communication device. On the other hand, the cellular phones 4a and 4b can make a phone call to an external communication device over the MFP3 and the public switched telephone networks 2, without using a cell phone carrier.

The cordless telephone system 1 allows an extension call between the child devices. For the extension call, for example, when the user operates the cellular phone 4a to press the extension number of the cellular phone 4b, the cellular phone 4b is called via the MFP 3 serving as a master of the Bluetooth wireless communication and makes ringing sounds. The user presses the talk button of the cellular phone 4b, so that an extension call is started between the cellular phone 4a and the cellular phone 4b through the MFP 3. An extension call between the MFP 3 serving as a parent device and the cellular phone 4a, 4b serving as a child device is also possible.

In order to configure the cordless telephone system 1 using the cellular phones 4a and 4b as child devices, it is necessary to register the cellular phones 4a and 4b with the MFP 3 as child devices. The procedure for registration will be specifically described later. As a child device, besides the cellular phone, it is also possible to register all devices, for example, a Personal Digital Assistance (PDA) and a wireless headset, capable of voice communication according to Cordless Telephony Profile or Handset Profile and having a Bluetooth communication module.

The arrangement of the MFP 3 and the cellular phone 4a included in the cordless telephone system 1 of FIG. 1 will now be described. Since the arrangement of the cellular phone 4b is the same as that of the cellular phone 4a, a description thereof will be omitted here.

The MFP 3 includes a CPU (central processing unit) 11, a ROM (read-only memory) 12, a RAM (random access memory) 13, an HDD (hard disk drive) 14, a displaying unit 15, a user-operated unit 16, a printing unit 17, a telephone connecting unit 18, a Bluetooth communication module 19, and a handset 20. They are connected each other through a system bus 32.

The ROM 12 constitutes part of a main storage space used by the CPU 11. The ROM 12 stores a system program for controlling the CPU 11, a child-device registration program, a child-device calling program and so on.

The RAM 13 constitutes part of the main storage space used by the CPU 11, together with the ROM 12. In the storage space of the RAM 13, a plurality or areas such as a working area, a terminal-device listing area, and a cordless telephone listing area are defined.

The working area stores working data which is temporarily necessary, an intermediate file and so on. The working area is used for performing the system program, the child-device registration program, a child-device calling program and so on.

The terminal-device listing area temporarily stores a list of identification information for terminal devices that can be registered as a child device (information that specifies each terminal device, such as a Bluetooth device address and a terminal-device identification number given by a user) when registering a child device and calling a child device. In the embodiment, the terminal-device listing area stores the Bluetooth device address (hereinafter, referred to as a BD address [BD_ADDR]) of the terminal device, which is transmitted from the Bluetooth communication module of a terminal device in the communication area 8. The BD address is a 12-digit letter string in which the digits are either of 0 to 9 and A to F.

The cordless telephone listing area temporarily stores a list of BD addresses for terminal devices that have Cordless Telephony Profile among the terminal devices whose BD address is stored in the terminal-device listing area. The terminal device having Cordless Telephony Profile can act as a cordless handset.

The CPU 11 reads the program stored in the ROM 12 for loading it into the RAM 13, and executes the program.

The HDD 14 stores the BD address, the name and so on of a terminal device registered as a child device. In the embodiment, the HDD 14 holds the BD address registered as a child device and the name of the terminal device inputted by the user in a designated area in association with each other. The BD address of the terminal device is stored in a designated area of the HDD 14, so that the terminal device acts as the child device of the MFP 3. Also, since the HDD 14 stores the name of the terminal device which is inputted by the user in association with the BD address of the terminal device, there is no need for the user to memorize the 12-digit BD address when calling the child device but the user has only to input the name of the terminal device which is given by the user. Accordingly, the usability is remarkably improved. It is also possible to use a semiconductor memory such as a user-rewritable EEPROM (electrically erasable and programmable read-only memory) in place of the HDD 14.

The displaying unit 15 is connected to the system bus 32 through an input/output interface (not shown), and it includes a display such as a liquid crystal display and a plasma display. The displaying unit 15 is used to display the BD address of the terminal device stored in the terminal-device listing area when a terminal device is registered as a child device, to display the name of the terminal device stored in the HDD 14 when calling a child device, to display information concerning various functions as a telephone, and the like.

The user-operated unit 16 is connected to the system bus 32 through an input/output interface (not shown), and it is used for the user to perform input operation for the MFP 3. In the embodiment, the user-operated unit 16 is a plurality of push-button switches arranged side by side. A modification of the user-operated unit 16 may be a touch panel adhered to the surface of the displaying unit is, or alternatively, may include both of them. The user uses the user-operated unit 16 when selecting a BD address to be registered as a child device from among the BD addresses of the terminal devices displayed on the displaying unit 15 in child-device registration, when selecting a desired child device to call a child device, and when performing input operations for various functions as telephone equipment.

The printing unit 17 is connected with the system bus 32 through an input/output interface (not shown), and it prints letters, characters or graphics on paper in color or monochrome. The printing unit 17 is also used to print the BD address and the name of the terminal device registered as a child device and information concerning various functions as telephone equipment. The printing unit 17 is not absolutely necessary for the MFP 3 and may not be included in the MFP 3.

The telephone connecting unit 18 connects the MFP 3 with the public switched telephone networks 2 and connects the cellular phone 4a with the public switched telephone networks 2 through the Bluetooth communication module 19 of the MFP 3.

The handset 20 is connected with the system bus 32 through an input/output interface (not shown). The handset 20 includes a speaker and a microphone. The speaker in the handset 20 generates a beep sound for informing a user of an incoming call. The microphone in the handset 20 transforms the voice of a user into a electric signal. In a modification, the speaker provide the same information as shown by displaying unit 15 in a voice message for a user.

The Bluetooth communication module 19 is connected with the system bus 32 through an input/output interface (not shown), and it performs Bluetooth short-range wireless communication with a Bluetooth communication module mounted to a terminal device (for example, with a Bluetooth communication module 29 mounted to the cellular phone 4a). The Bluetooth communication module 19 allows data communication at a maximum data transfer rate of 1 Mbps in the range of about 10 meters in radius in the wireless frequency band of 2.4 GHz by FH (frequency hopping) spread spectrum modulation.

The cellular phone 4a includes a CPU 21, a ROM 22, a RAM 23, an EEPROM (electrically erasable and programmable read-only memory) 24, a displaying unit 25, a user-operated unit 26, a voice communication unit 27, a vibrator 28, and a Bluetooth communication module 29. They are connected each other through a system bus 34.

The ROM 22 constitutes part of a main storage space used by the CPU 21. The ROM 22 stores a system program for controlling the CPU 21, and so on.

The RAM 23 constitutes part of the main storage space used by the CPU 21, together with the ROM 22. In the storage space of the RAM 23, a plurality of areas such as a working area are defined.

The CPU 21 reads the program stored in the ROM 22 for loading it into the RAM 23, and executes the program.

The EEPROM 24, which is a user-rewritable nonvolatile memory, stores data that requires frequent rewrite (such as base-station data and billing data for the cellular phone), the serial number of products and so on. Since the EEPROM 24 is a nonvolatile memory, stored data is not erased even if the cellular phone 4a is turned off.

The displaying unit 25 is connected to the system bus 34 through an input/output interface (not shown), and it includes a display such as a liquid crystal display and a plasma display. The displaying unit 25 is used to display information concerning various functions as a terminal device.

The user-operated unit 26 is connected to the system bus 34 through an input/output interface (not shown), and it is used for the user to perform input operation for the cellular phone 4a. In this embodiment, the user-operated unit 26 is input keys having a plurality of pushbutton switches arranged side by side. A modification of the user-operated unit 26, may be a touch panel adhered to the surface of the displaying unit 25.

The voice communication unit 27 is connected to the system bus 34 through an input/output interface (not shown). The voice communication unit 27 includes a speaker and a microphone. The speaker in the unit 27 generates a beep sound for informing a user of an incoming call. It is also possible for the speaker in the unit 27 not to make the ringing sounds in an incoming call. The microphone in the unit 27 transforms the voice of a user into a electric signal.

The vibrator 28 is connected with the system bus 34 through an input/output interface (not shown). The vibrator 28 vibrates the cellular phone 4a itself. The vibrator 28 may include a motor. The vibrator 28 generates vibration when the MFP 3 has executed the calling program for the cellular phone 4a to notify the user of an incoming call. The vibrator 28 may be set by the user so as to be operable only when the speaker in the voice communication unit 27 is set not to make ringing sounds. In a modification, the cellular phone 4a does not include the vibrator 28.

The Bluetooth communication module 29 is connected with the system bus 34 through an input/output interface (not shown), and it performs Bluetooth short-range wireless communication with a Bluetooth communication module 19 mounted to the MFP 3. A flash memory in the Bluetooth communication module 29 stores a BD address which is identification information unique to the module, and software in accordance with Cordless Telephony Profile. The BD address and Cordless Telephony Profile are sent from the Bluetooth communication module 29 to the MFP 3 in response to a request from the MFP 3 in registering a child device.

Figure 3:
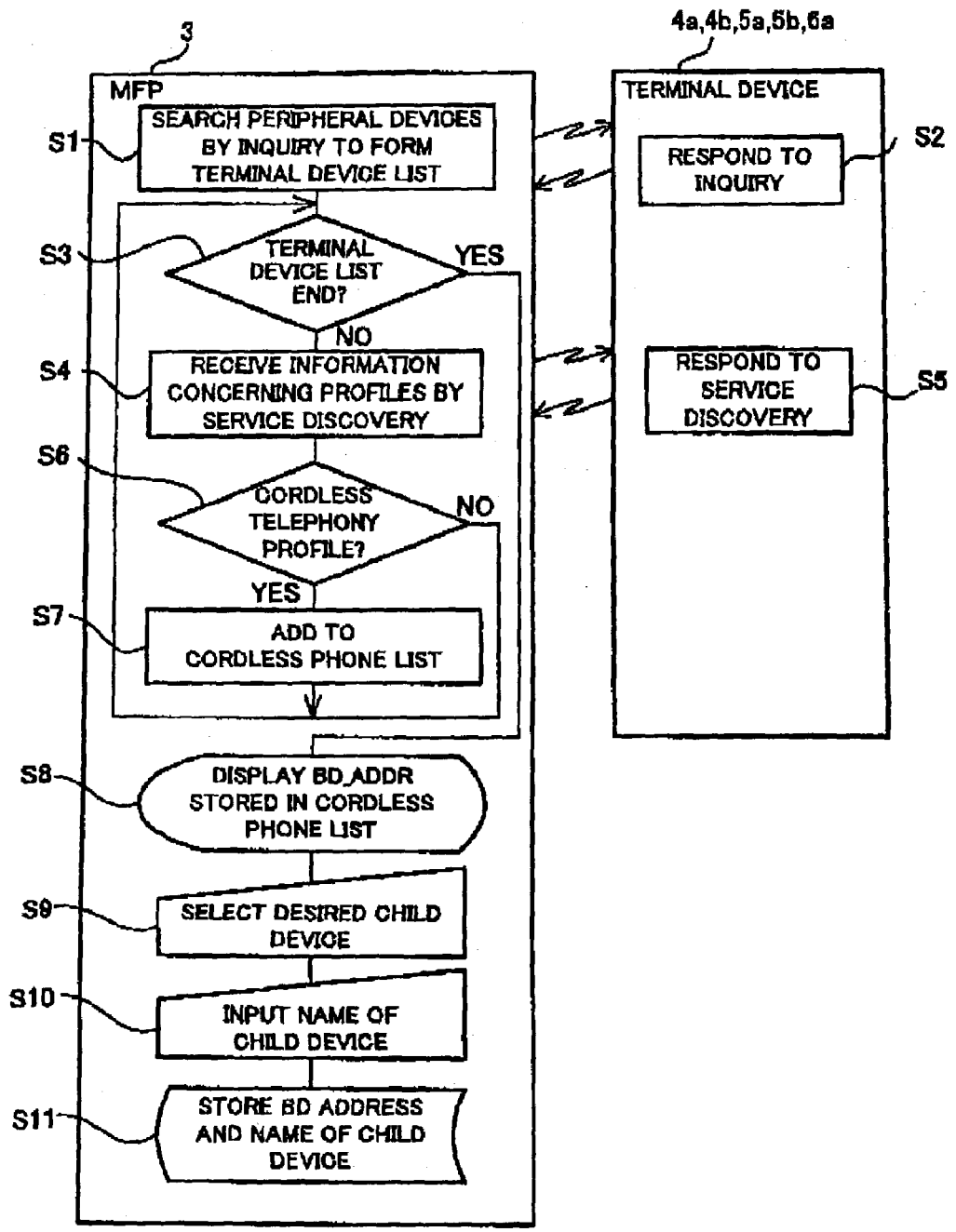
FIG. 3 is a flowchart of a registration process about a child device to a telephone equipment in the cordless telephone system of FIG. 1.

The child-device registration process in the cordless telephone system 1 will then be described. FIG. 3 is a flowchart of a child-device registration process in the embodiment. In STEP 1, the MFP 3 sends a signal from the Bluetooth communication module 19 mounted to the MFP 3 to search (hereinafter, referred to as "Inquiry" in the Bluetooth specification) the terminal device in the communication area 8. In STEP 2, upon receiving an Inquiry which is an identification-information transmit command, the terminal devices 4a, 4b, 5a, 5b, and 6a in the communication area 8 transmit the respective BD addresses held in the terminal devices to the Bluetooth communication module 19 mounted to the MFP 3. The MFP 3 stores the BD addresses sent from the terminal devices to the terminal-device listing area of the RAM 13.

The MFP 3 also sequentially sends, in STEP 4, a Service Discovery (command to inquire of target terminal devices about the profile held therein) to the terminal devices 4a, 4b, 5a, 5b, and 6a detected by the Inquiry. This step is repeated until it is judged, in STEP 3, that a service Discovery is sent to all terminal devices whose BD address is stored in the terminal-device listing area.

In STEP 5, the terminal devices 4a, 4b, 5a, 5b, and 6a receive the Service Discovery sent from the Bluetooth communication module 19 mounted to the MFP 3 with the Bluetooth communication module 29. In response to the signal, the Bluetooth communication module 29 of the terminal devices sends information concerning the profiles held in the terminal devices 4a, 4b, 5a, 5b, and 6a (such as Cordless Telephony Profile indicating that the terminal device acts as a cordless handset, and Fax Profile indicating that the terminal device acts as a facsimile) to the Bluetooth communication module 19 mounted to the MFP 3.

Figure 5:
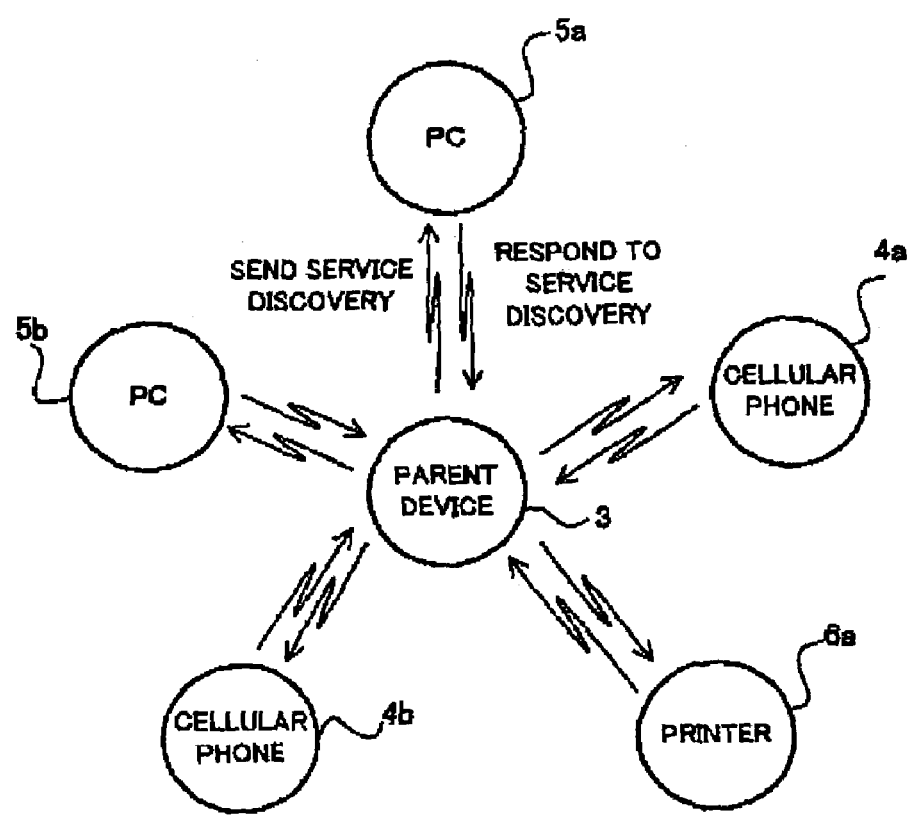
FIG. 5 is a schematic diagram showing the state of response to service Discovery in the cordless telephone system of FIG. 1.

Referring to FIG. 5, for example, the MFP 3 serving as a parent device sends a Service Discovery for inquiring the service to the five terminal devices 4a, 4b, 5a, 5b, and 6a in the communication area 8. In response to the Service Discovery, the terminal devices 4a, 4b, 5a, 5b, and 6a send information concerning their own profiles to the MFP 3. The MFP 3 receives the information concerning the profiles sent from the terminal devices 4a, 4b, 5a, 5b, and 6a. The MFP 3 temporarily stores the received information concerning the profiles in the terminal-device listing area of the RAM 13.

Next, in STEP 6, it is judged whether or not the terminal device, whose information concerning the profiles has been stored in the terminal-device listing area in STEP 4, has Cordless Telephony Profile. If the terminal device does not have Cordless Telephony Profile (NO in STEP 6), skip STEP 7 and return to STEP 3. If the terminal device has Cordless Telephony Profile (YES in STEP 6), the BD address of the terminal device is stored in the cordless telephone listing area.

Go to STEP 8, when it is judged, in STEP 3, that a Service Discovery is sent to all terminal devices whose BD address is stored in the terminal-device listing area (YES in STEP 3). In STEP 8, the displaying unit 15 displays the BD addresses stored in the cordless telephone listing area of the RAM 13. FIG. 4A is an example of the display when five terminal devices having Cordless Telephony Profile are detected by Service Discovery. In the example of rig. 4A, five BD addresses corresponding to the five terminal devices, [00:04:76:B6:4E:7A], [00:50:CD:12:0B:19], [00:50CD:14:A4:14], [00:50:CD:14:A4:C1], and [00:A0:96:1F:91:91], are displayed on the displaying unit 15. The speaker in the handset 20 may generate the same information as shown by the display in the displaying unit 15 in a voice message.

At that time, when the terminal device that has already been registered as a child device is present in the communication area 8, also the terminal device sends the BD address and the information concerning the profile in response to the Inquiry and the Service Discovery, respectively. In the embodiment, however, the BD address received from the terminal device is compared with the memory contents in the HDD 14, so that the BD address received from the registered terminal device is not displayed, thus preventing the user from performing duplicate registration to the same terminal device.

In this embodiment, only the BD address of a terminal device that has Cordless Telephony Profile is displayed. Therefore it is possible to prevent a terminal device that is not suitable for a child device or the device that is impossible for voice communication from being registered by mistake, even if such terminal device responds to the Inquiry and the Service Discovery.

In a modification, the BD addresses of all the terminal devices responding to the Inquiry may be displayed without STEP 6 and STEP 7.

In STEP 9, the BD address of a terminal address to be registered as a child device is selected by a user from a plurality of the BD addresses displayed on the displaying unit 15 by the operation of the user-operated unit 16. In the embodiment, a cursor key included in the user-operated unit 16 is pressed to place a cursor on a desired BD address. Referring to FIG. 4A, the BD address [00:50:CD:14:A4:14] displayed in inverse video is the BD address on which a cursor is placed. In this manner, the cursor is placed on the desired BD address and then a prescribed key operation is performed, and thus, a BD-address selecting process is completed.

In STEP 10, a child-device input screen, shown in FIG. 4B, is displayed on the displaying unit 15. At that time, the user operates the user-operated unit 16 to input an arbitrary name given by the user to the terminal device selected in STEP 4. For the name, when the terminal device is a cellular phone, the name or the nickname of the user is used. In addition to the above described procedure, the name of the terminal device can also be inputted by transmitting a command to a terminal device, which requests transmission of the name of the terminal device stored or registered in itself to the MFP 3 after or with a response to the Inquiry or transmission of the Service Discovery, and receiving the name from the terminal device as a response to the command. In this cace, the names received are shown on the display in STEP 8, then a user select one or more terminal devices to be registered as child devices. The name of the terminal device inputted as described may be changed, for avoiding duplication of names, by operation of the user-operated unit 16 by a user. A product name, location information where the device is installed, or a group name can be used instead of a name.

In STEP 11, the BD address of the terminal device selected in STEP 9 and the name of the terminal device inputted in STEP 10 are stored in a prescribed area of the HDD 14 in association with each other. In an example of FIG. 4C, the BD address of the terminal device, [00:50:CD:14:A4:14], is stored in association with the user name "Harry", and the BD address of the terminal device, [00:04:76:B6:4E:7A], is stored in association with the user name "Helen". The BD addresses of other three terminal devices stored in association with the user name.

The child-device registration process is completed by the procedure mentioned above. By the repeated cycles of STEP 9 to STEP 11, a plurality of terminal devices can be registered in the MFP 3 as child devices. Thus, in the cordless telephone system according to the embodiment, child-device register information is stored only in the MFP 3 serving as a parent device but is not stored in the child device.

The child-device registration process mentioned above also functions as authentication procedures of the Bluetooth device. Accordingly, a terminal device can be used as a child device only the child-device registration process are performed, even if the authentication procedures are not performed between the terminal device and the MFP 3.

A modification of the child-device registration process described above may be made in which the user selects the terminal device to be registered as a child device in STEP 9 by inputting characters constituting the BD address one by one with a keyboard. Another modification may be made in which when the BD address is displayed on the displaying unit 15 in STEP 8, another letter string of a relatively small number of digits which is associated with the BD address, for example, "0" to "5", may be displayed before or after the letter string indicating each BD address. Accordingly, since a desired terminal device can be selected by inputting the letter string of a relatively small number of digits when the terminal device for a child device is selected in STEP 9, the trouble of inputting can be decreased as compared with inputting the letter string indicating the BD address of the terminal device.

Figure 6:
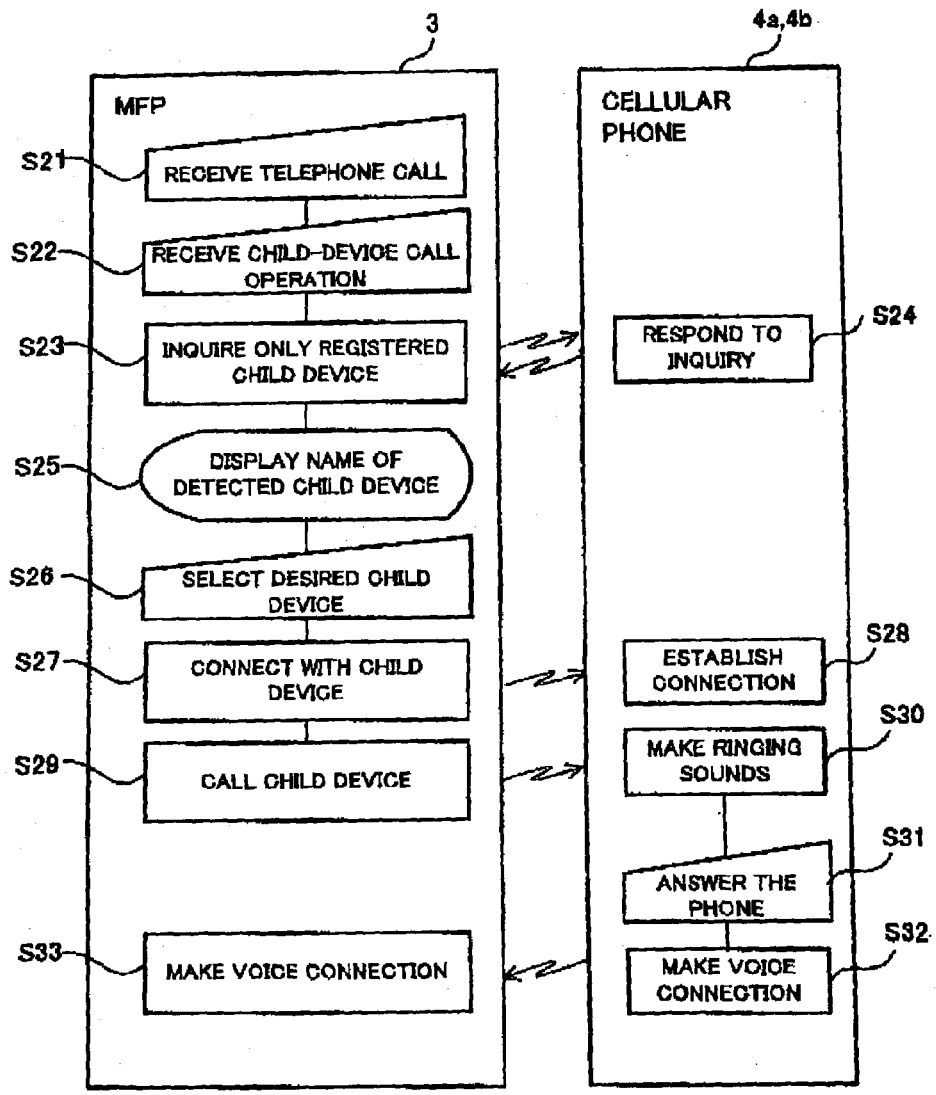
FIG. 6 is a flowchart of a calling process for a child device in the cordless telephone system of FIG. 1.

The child-device calling process in the cordless telephone system 1 when an incoming call arrives will be described. FIG. 6 is a flowchart of the child-device calling process.

In STEP 21, first, a user operates the MFP 3 to take a telephone that has received an incoming call over a phone line. In STEP 22, the user performs a prescribed operation serving as a trigger to call a child device (child-device call trigger operation) for the user-operated unit 16. The child-device call trigger operation may be to push a specific button in the user-operated unit 16.

When the child-device call trigger operation has been done, in STEP 23, the MFP 3 sends the Inquiry to the terminal devices registered as a child device on the basis of the memory contents of the HDD 14.

On the other hand, in STEP 24, the terminal device registered as a child device receives an Inquiry signal sent from the Bluetooth communication nodule 19 by the Bluetooth communication module 29. In response to the Inquiry, the Bluetooth communication module 29 sends the BD address of its own to the MFP 3. The MFP 3 stores the BD address that is sent from the terminal device registered as a child device in the terminal-device listing area.

Figure 7:
FIG. 7 is an example of a child-device select screen displayed on the telephone equipment in the cordless telephone system of FIG. 1, when a child device to be called is selected.

In STEP 25, the MFP 3 reads the name corresponding to the BD address that is stored in the terminal-device listing area from the HDD 14 and displays it on the displaying unit 15. FIG. 7 shows an example of the display when five terminal devices have responded to the Inquiry. At that time, the speaker in the handset 20 may provide the same information as shown by displaying unit 15 in a voice message.

In STEP 26, the user operates the user-operated unit 16 to move a cursor, thereby selecting the name of a child device to be called from the names displayed on the displaying unit 15. Then, the user-operated unit 16 is operated to complete the selecting process.

Subsequently, in STEP 27, the MFP 3 pages the terminal device registered as a child device which is selected in STEP 26. In STEP 28, synchronization of the Bluetooth communication between the selected child device and the MFP 3 is established.

In STEP 29, the MFP 3 calls the child device that has been synchronized. More specifically, the Bluetooth communication module 19 of the MFP 3 sends a signal to call the terminal device that has been synchronized and registered as a child device. In STEP 30, a cellular phone registered as a child device, which has received the signal, makes ringing sounds from the speaker of the voice communication unit 27.

In the embodiment, the cellular phone that has received the call signal is constructed to make ringing sounds from the speaker of the voice communication unit 27. The vibrator 28, however, may vibrate the cellular phone itself without making the ringing sounds.

In STEP 31, when the user operates the user-operated unit 26 of the cellular phone to answer the phone, in STEP 32, voice connection is established between the MFP 3 and the cellular phone serving as a child device according to Cordless Telephony Profile. In STEP 33, a voice connection is made for the public switched telephone networks 2 connected with the MFP 3. Accordingly, the cellular phone registered as a child device is allowed to communicate with an external communication device connected with the public switched telephone networks 2 through the MFP 3 and the public switched telephone networks 2.

Figure 8:
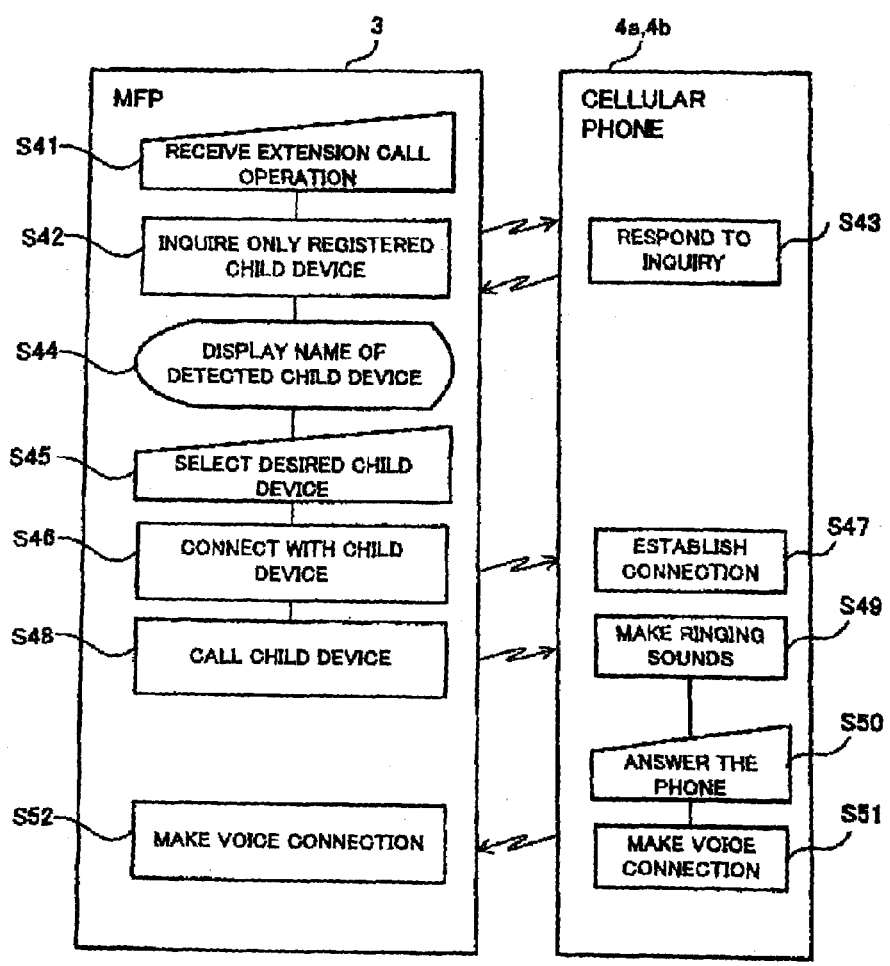
FIG. 8 is a flowchart of a extension calling process for a child device in the cordless telephone system of FIG. 1.

The child-device extension calling process in the cordless telephone system 1 from the parent device to a child device will be described. FIG. 8 is a flowchart of the child-device extension calling process.

In STEP 41, first, a user performs a prescribed operation serving as a trigger to call an extension child device (extension call trigger operation) for the user-operated unit 16. The extension call trigger operation may be to push a specific button in the user-operated unit 16.

When the extension call trigger operation has been done, in STEP 42, the child-device call trigger operation has been done, in STEP 23, the MFP 3 sends the Inquiry to the terminal devices registered as a child device on the basis of the memory contents of the HDD 14.

On the other hand, in STEP 43, the terminal device registered as a child device receives an Inquiry signal sent from the Bluetooth communication module 19 by the Bluetooth communication module 29. In response to the Inquiry, the Bluetooth communication module 29 sends the BD address of its own to the MFP 3. The MFP 3 stores the BD address that is sent from the terminal device registered as a child device in the terminal-device listing area.

In STEP 44, the MFP 3 reads the name corresponding to the BD address that is stored in the terminal-device listing area from the HDD 14 and displays it on the displaying unit 15.

In STEP 45, the user operates the user-operated unit 16 to move a cursor, thereby selecting the name of a child device to be called as an extension from the names displayed on the displaying unit 15. Then, the user-operated unit 16 is operated to complete the selecting process.

Subsequently, in STEP 46, according to Cordless Telephony Profile, the MFP 3 pages the terminal device registered as a child device which is selected in STEP 45. In STEP 47, synchronization of the Bluetooth communication between the selected child device and the MFP 3 is established.

In STEP 48, the MFP 3 calls the child device that has been synchronized. More specifically, the Bluetooth communication module 19 of the MFP 3 sends a signal to call the terminal device that has been synchronized and registered as a child device. In STEP 49, a cellular phone registered as a child device, which has received the signal, makes ringing sounds from the speaker of the voice communication unit 27.

In STEP 50, when the user operates the user-operated unit 26 of the cellular phone to answer the phone, in STEP 51 and STEP 52, voice connection is established between the MFP 3 and the cellular phone serving as a child device. Accordingly, the cellular phone registered as a child device is allowed to communicate as an extension with the MFP 3.

As described above, since the BD addresses of a plurality of terminal devices capable of voice communication are displayed on the MFP 3, from which the user selects a terminal device to be registered as a child device, and thus the child device is registered, the child-device registration can easily be completed in a short time. Further, it is possible to prevent a terminal device that is impossible for voice communication from being registered by mistake.

In registering a child device, since the highly versatile Bluetooth communication is employed as wireless communication between the MFP 3 and the terminal device such as the cellular phone 4a, a child device made by a third party can be selected and registered as the child device of the MFP 3. In the registration of a child device, since there is no need for the user to perform any operations for the terminal device, even the terminal device made of a third party without a user interface (for example, a headset) can easily be registered with the MFP 3 serving as a parent device.

In the embodiment, in registering a child device, since the BD address of the terminal device and the name of the terminal device that has arbitrarily been inputted by the user are stored in the MFP 3 in association with each other, a terminal device to be called can be designated according to the given name, which is easy to use for the user.

In addition, according to the embodiment, making ringing sounds from the speaker of the voice communication unit 27 in the terminal device registered as a child device allows the cellular phone 4a registered as a child device to be notified that the MFP 3 has an incoming call. Also, the MFP 3 allows the connection between the cellular phone 4a registered as a child device and an external communication device, thereby allowing the communication with an external party by using the cellular phone 4a registered as a child device.

In registering a child device, when the MFP 3 sends an Inquiry, a terminal device that has received the Inquiry returns the BD address to the MFP 3. Accordingly, periodical transmission of the Inquiry allows an available terminal device to be updated every time. Therefore, the user is prevented from selecting an unavailable terminal device.

A second embodiment of the invention will next be described. The rough arrangement of a cordless telephone system of the embodiment is similar to that of the first embodiment described above. The embodiment, however, is different from the first embodiment in that, in registering a child device, the MFP 3 sends a Service Discovery in which only terminal devices having a prescribed profile (for example, Cordless Telephony Profile) respond to return information concerning the profile.

Figure 9:
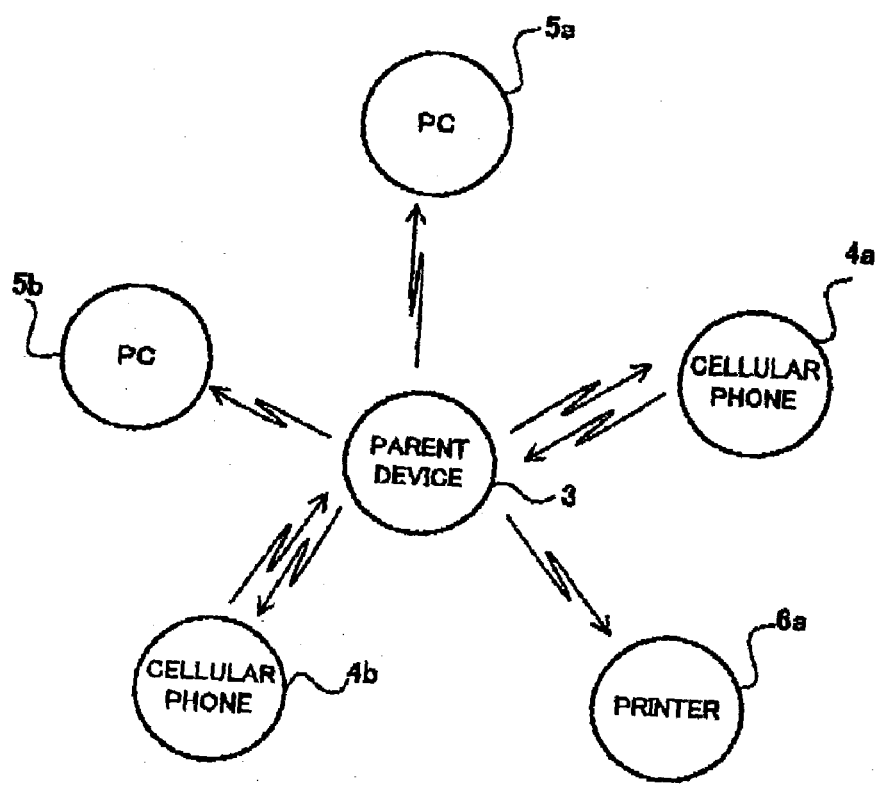
FIG. 9 is a schematic diagram showing the state of response to an inquiry in a cordless telephone system according to a second embodiment of the invention.

For example, when only terminal devices having Cordless Telephony Profile are allowed to respond to the Service Discovery, the cellular phones 4a and 4b respond to the Service Discovery from the MFP 3 to send information concerning cordless Telephony Profile but the PCs 5a and 5b and the printer 6a which do not support Cordless Telephony Profile do not respond to the Service Discovery, as shown in FIG. 9. Then, the MFP 3 displays only the BD addresses of the terminal devices that have responded to the Service Discovery on the display of the displaying unit 15.

Consequently, as in the first embodiment, terminal devices that are not suitable for child devices (e.g., the PCs 5a and 5b and the printer 6a) are not displayed on the displaying unit 15, thus preventing erroneous registration of the terminal devices that are not suitable for child devices. Furthermore, the embodiment offers the advantages similar to those of the first embodiment.

As a modification of the embodiment, only terminal devices having a prescribed profile (e.g., Cordless Telephony Profile) may be allowed to respond to the Inquiry. Then, only the BD addresses of the terminal devices that have responded to the inquiry are displayed on the displaying unit 15. With such an arrangement, the erroneous registration of the terminal devices that are not suitable for child devices can be prevented.

In the embodiment described above, the cordless communication system that employs the Bluetooth wireless communication system between the MFP 3 and the cellular phone 4a was described. In place of the Bluetooth wireless communication system, however, other wireless communication systems such as an IEEE 802.11 high-rate system may be employed.

The phone line connected with the telephone equipment may be cell phone lines or IP (Internet Protocol) phone lines (the Internet or dedicated IP transmission networks) other than the public switched telephone networks. It is also possible to register terminal devices having a profile other than Cordless Telephony Profile as child devices. In other words, the cordless telephone system of the invention may be used for communication other than the voice communication, such as data communication.

In the child-device calling process described above, when receiving an incoming call over a phone line, the MFP 3 calls a terminal device registered as a child device. Such a calling for the child device, however, may not necessarily be made. Also, when the MFP 3 has recognized an incoming call over the phone line, ringing sounds may immediately be made from the speaker of the voice communication unit 27 in all the registered cellular phones 4a and 4b. In other words, the STEPS 21, 22, 25, and 26 in FIG. 6 may not be performed. Alternatively, ringing sounds may immediately be made from the speaker of the default cellular phone, when receiving an incoming call over a phone line.

When a terminal device to be called is selected from the terminal devices registered as child devices, the names of the terminal devices are displayed on the displaying unit 15; however, only the BD addresses of the terminal devices may be displayed. In this case, the input of the names of the terminal devices to be registered as child devices may be omitted. Also, both the names and the BD addresses of the terminal devices may be displayed.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A cordless telephone system having a plurality of terminal devices and telephone equipment capable of wireless communication with the terminal devices and connectable to a phone line, the system allowing a terminal device of the plurality of terminal devices to communicate with an external communication device connected to the phone line, the terminal devices including one or more first terminal devices having a cordless telephone profile for a child device of the telephone equipment and one or more second terminal devices having a profile other than the profile for the child device, wherein each of the first terminal devices comprises:
an identification-information memory unit that stores terminal-device identification information; and
a wireless communication unit that transmits the identification information stored in the identification-information memory unit and the profile for the child device to the telephone equipment;
wherein each of the second terminal devices comprises a wireless communication unit that transmits the profile other than the profile for the child device by wireless communication, and wherein the telephone equipment comprises:
a wireless communication unit capable of wireless communication with the wireless communication unit of either the first terminal device or the second terminal device;
a judging unit that judges whether the profile sent by the terminal device is the profile for the child device or not;
an output unit that outputs, explicitly to a user, only the identification information of a terminal device whose profile is judged as the profile for the child device by the judging unit, the terminal device being included in the terminal device having transmitted the identification information;
a user-operated unit operated by the user for selectively inputting the identification information about a terminal device outputted by the output unit; and
a register unit that stores the identification information about the terminal device so that the terminal device acts as a child device, the identification information about the terminal device being inputted through the user-operated unit.

2. The cordless telephone system according to claim 1,
a wherein when an incoming call to the telephone equipment over the phone line is detected, the wireless communication unit of the telephone equipment sends an incoming-call notification to the terminal device, the identification information of which is stored in the register unit; and
wherein the first terminal device further comprises a notification unit for notifying the user of the incoming call to the telephone equipment over the phone line upon receiving the incoming-call notification from the telephone equipment.

3. The cordless telephone system according to claim 1,
wherein the wireless communication unit of the telephone equipment sends an identification-information transmission command for requiring the terminal device to send the identification information; and
wherein the wireless communication unit of the first terminal device sends the identification information stored in the identification-information memory unit to the telephone equipment upon receiving the identification-information transmission command sent from the telephone equipment.

4. The cordless telephone system according to claim 3, wherein the wireless communication unit of the telephone equipment sends an identification-information transmission command such that only the first terminal device returns the identification information stored in the identification-information memory unit to the telephone equipment.

5. The cordless telephone system according to claim 1,
wherein the wireless communication unit of the telephone equipment sends a command such that among the plurality of terminal devices capable of wireless communication with the telephone equipment, only the first terminal device returns the identification information to the telephone equipment; and
wherein among the plurality of terminal devices capable of wireless communication with the telephone equipment, only the wireless communication unit of the first terminal device specified by the command from the telephone equipment responds to the command to send the information to the telephone equipment.

6. The cordless telephone system according to claim 1, wherein both the wireless communication unit of the telephone equipment and the wireless communication unit of each of the first and second terminal devices are Bluetooth communication units, wherein the Bluetooth communication unit of the telephone equipment sends a Service Discovery; and among the plurality of terminal devices capable of Bluetooth communication with the telephone equipment, only the Bluetooth communication unit of the first terminal device specified by the Service Discovery responds to the Service Discovery from the telephone equipment to send information concerning the profile held by the terminal device.

7. The cordless telephone system according to claim 1, wherein the wireless communication unit of the telephone equipment mediates the voice communication between the telephone equipment and the terminal device, the identification information of which is stored in the register unit.

8. The cordless telephone system according to claim 1, wherein the register unit stores the name of the terminal device inputted through the user-operated unit in association with the identification information of the terminal device.

9. The cordless telephone system according to claim 1, wherein the identification information is a Bluetooth Device address of the terminal device.

10. The cordless telephone system according to claim 1, wherein the output unit displays the identification information only for a terminal device that satisfies a condition that the register unit has not registered the terminal device yet.

11. A telephone equipment used in a cordless telephone system having a plurality of terminal devices and the telephone equipment capable of wireless communication with the terminal devices and connectable to a phone line, and a terminal device capable of wireless communication with the telephone equipment, the system allowing a terminal device of the plurality of terminal devices to communicate with an external communication device connected to the phone line, the terminal devices including one or more first terminal devices having a cordless telephone profile for a child device of the telephone equipment and one or more second terminal devices having a profile other than the profile for the child device, comprising:

a wireless communication unit;

a judging unit that judges whether the profile sent by the terminal device is the profile for the child device or not;

an output unit that outputs, explicitly to a user, only the identification information of a terminal device whose profile is judged as the profile for the child device by the judging unit, the terminal devices being included in the terminal devices having transmitted the identification information;

a user-operated unit operated by the user for selectively inputting the identification information about a terminal device outputted by the output unit; and a register unit that stores the identification information about the terminal device so that the terminal device acts as a child device, the identification information about the terminal device being inputted through the user-operated unit.

12. The telephone equipment according to claim 11, wherein the identification information is a Bluetooth Device address of the terminal device.

13. The telephone equipment according to claim 11, wherein the wireless communication unit sends a command such that among the plurality of terminal devices capable of wireless communication with the telephone equipment, only the first terminal device returns the identification information to the telephone equipment.

* * * * *